US011060471B1

(12) United States Patent
Keating et al.

(10) Patent No.: US 11,060,471 B1
(45) Date of Patent: Jul. 13, 2021

(54) DEDICATED EXHAUST GAS RECIRCULATION CONTROL SYSTEMS AND METHODS

(71) Applicant: GM GLOBAL TECHNOLOGY OPERATIONS LLC, Detroit, MI (US)

(72) Inventors: Edward J. Keating, Ortonville, MI (US); Robert S. McAlpine, Lake Orion, MI (US); Lisa M. Marcella-O'Leary, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/740,978

(22) Filed: Jan. 13, 2020

(51) Int. Cl.
*F02B 47/08* (2006.01)
*F02D 41/00* (2006.01)

(52) U.S. Cl.
CPC .. *F02D 41/0077* (2013.01); *F02D 2041/0017* (2013.01)

(58) Field of Classification Search
CPC ........ F02M 26/00; F02M 26/05; F02M 26/06; F02M 26/07; F02D 41/005
USPC ............ 123/568.11–568.14, 568.18, 568.21; 701/108
See application file for complete search history.

(56) References Cited

U.S. PATENT DOCUMENTS

| 5,029,569 A | * | 7/1991 | Cullen | F02D 41/28 123/494 |
| 5,136,517 A | * | 8/1992 | Cullen | F02D 41/04 123/478 |
| 2015/0361907 A1 | * | 12/2015 | Hayman | F02D 41/10 123/198 F |
| 2017/0198652 A1 | * | 7/2017 | Sczomak | F02D 41/0087 |
| 2017/0241364 A1 | * | 8/2017 | Sczomak | F02D 41/008 |

* cited by examiner

Primary Examiner — John Kwon
(74) Attorney, Agent, or Firm — Harness, Dickey & Pierce, P.L.C.

(57) ABSTRACT

An engine system includes: an internal combustion engine having a plurality of cylinders; a bypass valve arranged to receive exhaust output from at least a dedicated one of the cylinders and to selectively one of: direct the exhaust through an exhaust system to atmosphere; and direct the exhaust to an exhaust gas recirculation (EGR) valve; the EGR valve, where the EGR valve is configured to, when open, enable flow of the exhaust to an intake manifold of the internal combustion engine; and an intake air valve located between an air cleaner and a mass airflow (MAF) sensor and configured to, when open, enable flow of ambient air to the intake manifold.

15 Claims, 4 Drawing Sheets

DEDICATED EXHAUST GAS RECIRCULATION CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internal combustion engines and more particularly to intake and exhaust systems of internal combustion engines.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders generally increases the torque output of the engine.

Under some circumstances the use of dedicated exhaust gas recirculation (EGR) may be beneficial to engine efficiency. In the case of dedicated EGR, one or more cylinders of an engine may have their total (all) exhaust gas recirculated to the air induction system. In this case, their exhaust pulse is removed from the exhaust system and introduced into the air induction system.

SUMMARY

In a feature, an engine system includes: an internal combustion engine having a plurality of cylinders; a bypass valve arranged to receive exhaust output from at least a dedicated one of the cylinders and to selectively one of: direct the exhaust through an exhaust system to atmosphere; and direct the exhaust to an exhaust gas recirculation (EGR) valve; the EGR valve, where the EGR valve is configured to, when open, enable flow of the exhaust to an intake manifold of the internal combustion engine; and an intake air valve located between an air cleaner and a mass airflow (MAF) sensor and configured to, when open, enable flow of ambient air to the intake manifold.

In further features, an air/EGR mixer is configured to mix: the ambient air; and exhaust received from the EGR valve.

In further features, an EGR conduit is connected between the EGR valve and the air/EGR mixer, where the EGR conduit is less than a predetermined length.

In further features, the predetermined length is 2 feet.

In further features, a turbine of a turbocharger is located downstream of the bypass valve.

In further features, a compressor of the turbocharger is located downstream of the MAF sensor.

In further features, an EGR cooler is located between the bypass valve and the EGR valve and is configured to cool the exhaust flowing from the bypass valve to the EGR valve.

In further features, a delta pressure sensor is configured to measure a pressure delta across the intake air valve.

In further features: an EGR pressure sensor is configured to measure an EGR pressure at a location between the bypass valve and the EGR valve; and an exhaust pressure sensor is configured to measure a pressure of the exhaust in the exhaust system downstream of the bypass valve.

In further features: an EGR control module is configured to control opening of the EGR valve; an intake control module is configured to control opening of the intake air valve; and a bypass control module is configured to control actuation of the bypass valve.

In further features, the bypass control module is configured to, in response to a determination to perform EGR, actuate the bypass valve to direct the exhaust to the EGR valve.

In further features, in response to the determination to perform EGR, the intake control module is configured to, when a manifold absolute pressure within the intake manifold is greater than or equal to a barometric pressure, adjust the opening of the intake air valve based on a pressure delta across the intake air valve and a target delta pressure across the intake air valve.

In further features, the intake control module is configured to adjust the opening of the intake air valve based on adjusting the pressure delta across the intake air valve toward the target delta pressure across the intake air valve.

In further features, in response to the determination to perform EGR, the EGR control module is configured to, when the manifold absolute pressure within the intake manifold is greater than the barometric pressure, open the EGR valve to a predetermined fully open position.

In further features, in response to the determination to perform EGR, the intake control module is configured to, when the manifold absolute pressure within the intake manifold is less than the barometric pressure, adjust the opening of the intake air valve based on the pressure delta across the intake air valve and the target delta pressure across the intake air valve.

In further features, in response to the determination to perform EGR, the EGR control module is configured to, when the manifold absolute pressure within the intake manifold is less than the barometric pressure, adjust the opening of the EGR valve based on (1) a pressure difference between the EGR pressure and the pressure in the exhaust system downstream of the bypass valve and (2) a target value of the pressure difference between the EGR pressure and the pressure in the exhaust system downstream of the bypass valve.

In further features, the EGR control module is configured to adjust the opening of the EGR valve based on adjusting the pressure difference toward the target value of the pressure difference.

In further features, the bypass control module is configured to, in response to a determination to not perform EGR, actuate the bypass valve to direct the exhaust through the exhaust system to atmosphere.

In further features: the intake control module is configured to, in response to the determination to not perform EGR, open the intake air valve to a predetermined fully open position; and the EGR control module is configured to, in response to the determination to not perform EGR, close the EGR valve to a predetermined fully closed position.

In a feature, a method includes: by an internal combustion engine having a plurality of cylinders, producing exhaust; by a bypass valve, receiving exhaust output from at least a dedicated one of the cylinders and selectively one of: directing the exhaust through an exhaust system to atmosphere; and directing the exhaust to an exhaust gas recirculation (EGR) valve; by the EGR valve, when open, enabling flow of the exhaust to an intake manifold of the internal combustion engine; and by an intake air valve located between an air cleaner and a mass airflow (MAF) sensor, when open, enabling flow of ambient air to the intake manifold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine combusts an air and fuel mixture within cylinders to generate torque. Air flows through an air cleaner before flowing to an intake manifold of the engine. A mass air flowrate (MAF) sensor measures a mass air flowrate of air into the engine.

Combustion within the cylinders produces exhaust. The entire exhaust of one or more of the cylinders of the engine may be recirculated back to the engine via an exhaust gas recirculation (EGR) valve. A mixer may be implemented to mix recirculated exhaust with air flowing into the intake manifold and to even recirculated exhaust flow to the intake manifold.

According to the present application, an intake air valve is implemented between a turbocharger compressor and the air cleaner. More specifically, the intake air valve may be implemented between the air cleaner and the MAF sensor. An engine control module (ECM) controls the intake air valve and the EGR valve to minimize error in the measurements of the MAF sensor and to minimize engine noise emitted via the intake system.

Figure 1:
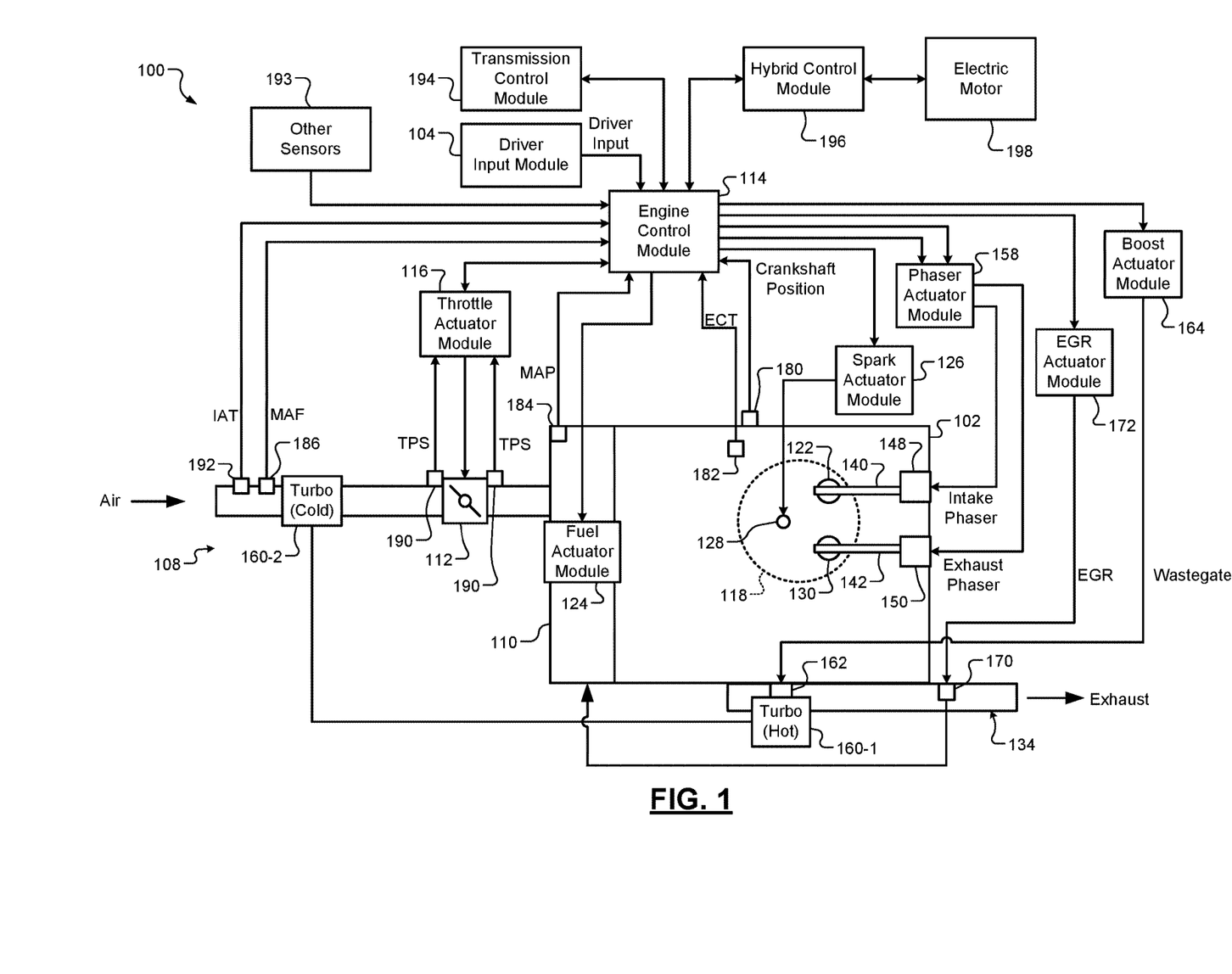
FIGS. 1 and 2 are functional block diagrams of an example engine system.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110. In various implementations, the throttle valve 112 and the throttle actuator module 116 may be omitted.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel (e.g., gasoline) may be injected directly into the cylinders or into mixing chambers/ports associated with the cylinders.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a turbocharger that provides pressurized air to the intake manifold 110. The turbocharger includes a turbine 160-1 that is driven by exhaust gases flowing through the exhaust system 134. The turbocharger also includes a compressor 160-2 that is driven by the turbine 160-1 and that compresses air leading into the throttle valve 112.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

Although shown separated for purposes of illustration, the turbine 160-1 and the compressor 160-2 may be mechanically linked to each other.

The engine system 100 may include an exhaust gas recirculation (EGR) valve 170, which selectively redirects exhaust gas back to the intake manifold 110. The EGR valve 170 may be controlled by an EGR actuator module 172. Additional discussion of the intake and exhaust systems is provided below in conjunction with FIG. 2.

Crankshaft position may be measured using a crankshaft position sensor 180. The crankshaft position sensor 180 monitors an N-toothed wheel that rotates with the crankshaft and generates a crankshaft position signal based on rotation of the N-toothed wheel. For example only, the crankshaft position sensor 180 may include a variable reluctance (VR) sensor or another suitable type of crankshaft position sensor. The N-toothed wheel includes space for N teeth.

The crankshaft position sensor 180 generates a pulse in the crankshaft position signal each time when a tooth of the N-toothed wheel (e.g., rising or falling edge of the tooth) passes the crankshaft position sensor 180. Accordingly, each pulse in the crankshaft position signal may correspond to an angular rotation of the crankshaft by an amount equal to 360° divided by N. For example only, the N-toothed wheel may include space for 60 equally spaced teeth (i.e., N=60), and each pulse in the crankshaft position signal may therefore correspond to approximately 6° of crankshaft rotation. In various implementations, one or more of the N teeth may be omitted. For example only, two of the N teeth may be omitted in various implementations. An engine speed may be determined based on the crankshaft position measured using the crankshaft position sensor 180.

A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194, for example, to coordinate shifting gears in a transmission. For example, the ECM 114 may reduce engine torque during a gear shift. The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Figure 2:
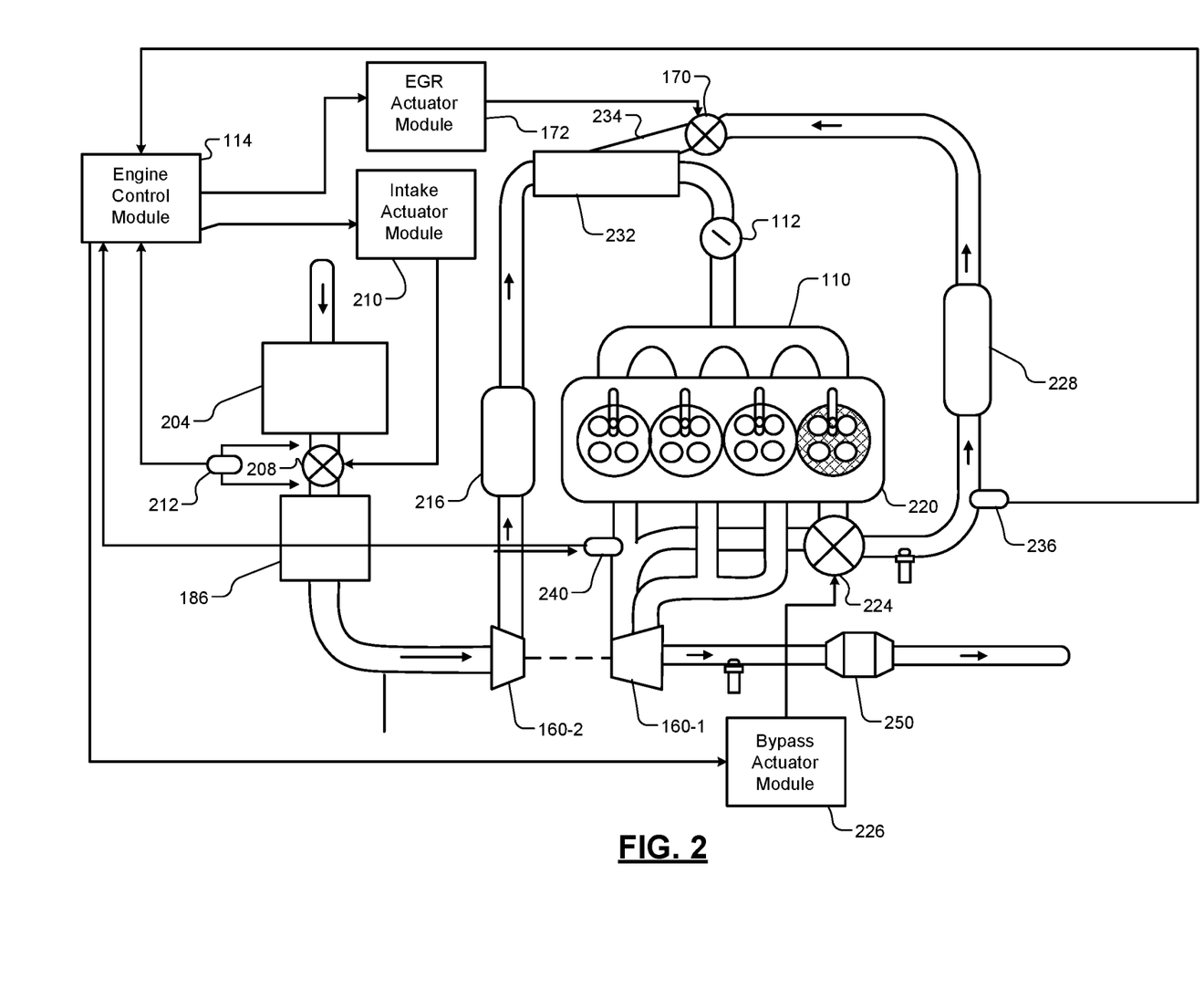

Referring now to FIG. 2, a functional block diagram of the example engine system of FIG. 1 is presented. As shown in FIG. 2, air flowing into the engine 102 flows through an air cleaner 204. The air cleaner 204 may include one or more filters to filter particulate from the air as the air flows through the air cleaner 204. An intake air valve 208 is located between the air cleaner 204 and the compressor 160-2, such as between the air cleaner 204 and the MAF sensor 186. Locating the intake air valve 208 between the air cleaner 204 and the compressor 160-2 and more particularly between the air cleaner 204 and the MAF sensor 186 may provide for more stable control. An intake actuator module 210 controls opening of the intake air valve 208 based on input from the ECM 114.

A delta pressure sensor 212 measures a pressure difference across the intake air valve 208. More particularly, the delta pressure sensor 212 measures a pressure difference based on a difference between a pressure downstream of the intake air valve 208 and a pressure upstream of the intake air valve 208.

A charge air cooler (CAC) 216 cools the air output by the compressor 160-2. In various implementations, an intercooler may be implemented in place of the CAC 216.

The engine 102 includes a plurality of cylinders. For example, the engine 102 may include four cylinders as shown in FIG. 2. The present application, however, is not limited to four cylinder engines. The engine 102 may include a greater or lesser number of cylinders. While the example of the engine 102 including a turbocharger is provided, the turbocharger may be omitted, and the engine 102 may be naturally aspirated. The charge air cooler 216 would be omitted if the turbocharger is omitted.

In the example of a turbocharged four cylinder engine, one of the cylinders is a dedicated exhaust gas recirculation (EGR) cylinder 220. The dedicated EGR cylinder 220 outputs exhaust to a bypass valve 224. In other engines, more than one cylinder may be a dedicated EGR cylinder. When in a first state, the bypass valve 224 directs the exhaust output by the dedicated EGR cylinder 220 exclusively to the exhaust turbine 160-1. When in a second state, the bypass valve 224 directs the exhaust output by the dedicated EGR cylinder 220 exclusively to the EGR valve 170. The bypass valve 224 may either be in the first state or the second state, and may not include any other states. The other cylinders all output exhaust gas to the turbine 160-1. Fueling, spark timing, and/or one or more other parameters of the dedicated EGR cylinder 220 may be controlled differently than the other cylinders. A bypass actuator module 226 controls opening of the bypass valve 224 based on input from the ECM 114.

An EGR cooler 228 is implemented between the EGR valve 170 and the bypass valve 224. The EGR cooler 228 cools the exhaust flowing through the EGR cooler 228. When open, the EGR valve 170 outputs received exhaust gas to an air/EGR mixer 232. The air/EGR mixer 232 mixes exhaust recirculated back from the dedicated EGR cylinder 220 with fresh air flowing into the engine 102. The air/EGR mixer 232 evens out pulses in the EGR from the dedicated EGR cylinder 220 such that a more even amount (with smaller changes) is provided to all cylinders of the engine 102.

The EGR valve 170 may be located as closely to the air/EGR mixer 232 as possible. For example, the EGR valve 170 may be connected to the air/EGR mixer 232 by an EGR conduit 234 that is of less than a predetermined length. The predetermined length may be, for example, 2 feet, 1 foot, 8 inches, or another suitable length.

An EGR pressure sensor 236 measures a pressure between the bypass valve 224 and the EGR cooler 228. An exhaust pressure sensor 240 measures a pressure of the exhaust input to the turbine 160-1.

As illustrated in FIG. 2, a three-way catalyst (TWC) 250 may treat the exhaust flowing through the turbine 160-1 before the exhaust is output to atmosphere.

Figure 3:
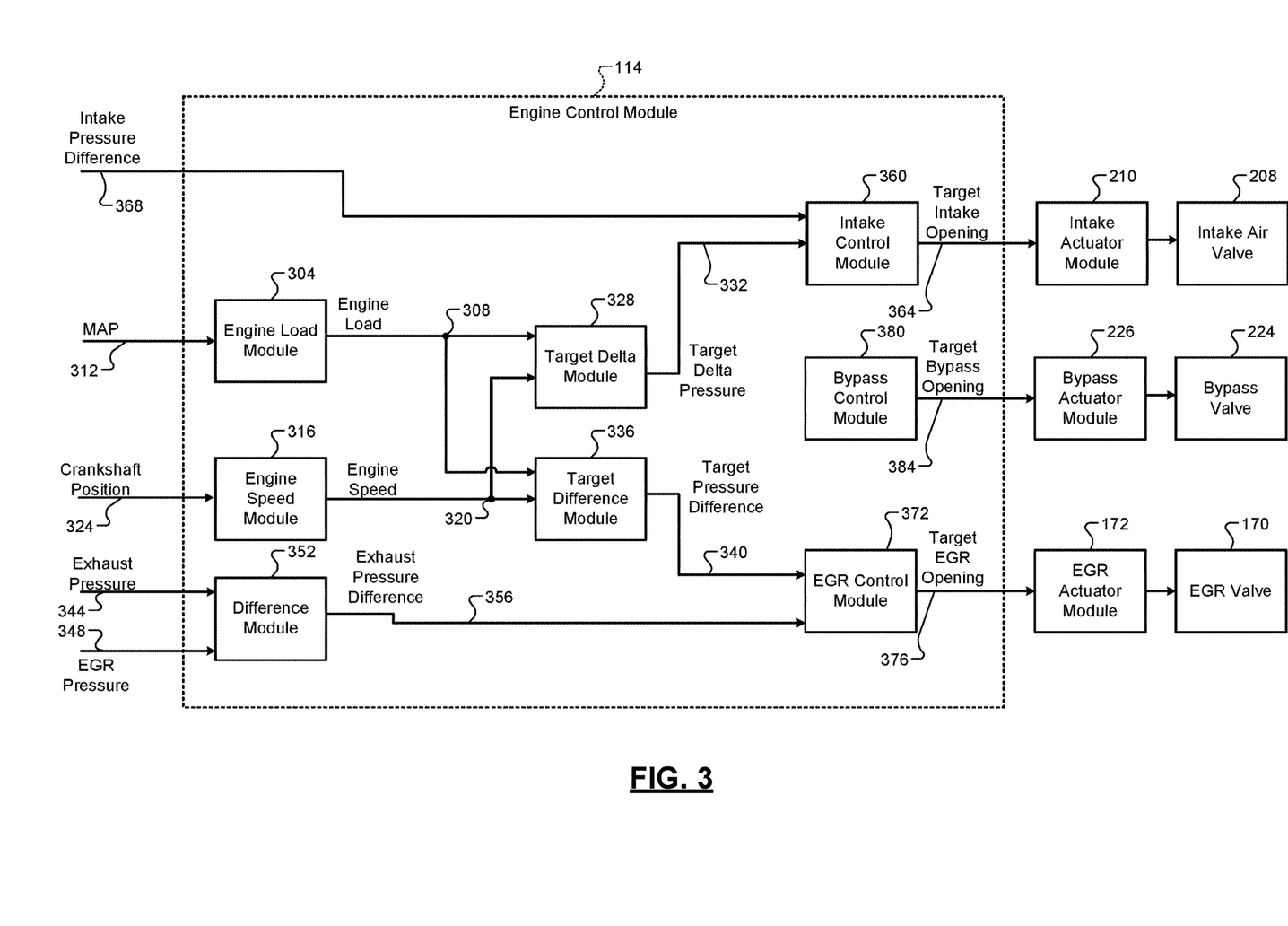
FIG. 3 is a functional block diagram of an example engine control system.

FIG. 3 is a functional block diagram of an example implementation of the ECM 114. An engine load module 304 determines a (present) engine load 308. The engine load module 304 may determine the engine load 308, for example, based on the (present) MAP 312 measured by the MAP sensor 184 relative to a predetermined maximum MAP of the engine 102. Based on driver input, the engine load module 304 may set the engine load 308 to a predetermined maximum value (e.g., 100 percent) where the MAP 312 is equal to the predetermined maximum MAP. Based on the driver input, the engine load module 304 may decrease the engine load 308 away from the predetermined maximum value and toward a predetermined minimum value (e.g., 0 percent) as the MAP 312 decreases away from the predetermined maximum MAP. Based on the driver input, the engine load module 304 may increase the engine load 308 toward the predetermined maximum value as the MAP 312 increases toward the predetermined maximum MAP.

An engine speed module 316 determines a (present) engine speed 320 based on the crankshaft position 324 measured using the crankshaft position sensor 180. For example, the engine speed module 316 may determine the engine speed 320 based on a change in the crankshaft position 324 over a period of time.

A target delta module 328 determines a target delta pressure 332 across the delta pressure sensor 212 based on the engine speed 320 and the engine load 308. The target delta module 328 may determine the target delta pressure 332, for example, using one of an equation and a lookup table that relates engine speeds and engine loads to target delta pressures. The target delta pressure 332 is a target measurement from the delta pressure sensor 212 (i.e., a target value of the intake pressure difference 368).

A target difference module 336 determines a target pressure difference 340 between the exhaust pressure 344 measured by the exhaust pressure sensor 240 and the EGR pressure 348 measured by the EGR pressure sensor 236. The target difference module 336 determines the target pressure difference 340 based on the engine load 308 and the engine speed 320. The target difference module 336 may determine the target pressure difference 340, for example, using one of an equation and a lookup table that relates engine speeds and engine loads to target pressure differences.

A difference module 352 determines an (present) exhaust pressure difference 356 based on a difference between the exhaust pressure 344 and the EGR pressure 348. For example, the difference module 352 may set the exhaust pressure difference 356 (1) based on or equal to the exhaust pressure 344 minus the EGR pressure 348 or (2) based on or equal to the EGR pressure 348 minus the exhaust pressure 344.

An intake control module 360 determines a target intake opening 364 of the intake air valve 208, as discussed further below. For example, the intake control module 360 may selectively set the target intake opening 364 to adjust the intake pressure difference 368 measured by the delta pressure sensor 212 toward the target delta pressure 332.

An EGR control module 372 determines a target EGR opening 376 of the EGR valve 170, as discussed further below. For example, the EGR control module 372 may selectively set the target EGR opening 376 to adjust the exhaust pressure difference 356 toward the target pressure difference 340.

A bypass control module 380 determines a target bypass opening 384 of the bypass valve 224. The bypass control module 380 may set the target bypass opening 384 such that the bypass valve 224 is in the first state when EGR flow is requested by the ECM 114 (e.g., the EGR valve 170 presently is or is requested to be at least partially open (e.g., more than 0 percent open)). The bypass control module 380 may set the target bypass opening 384 such that the bypass valve 224 is in the second state when EGR flow is disabled by the ECM 114 (e.g., the EGR valve 170 is or requested to be fully closed (e.g., 0 percent open)), such as during startup of the engine 102, during shutdown of the engine 102, during idling of the engine 102, etc.

Figure 4:
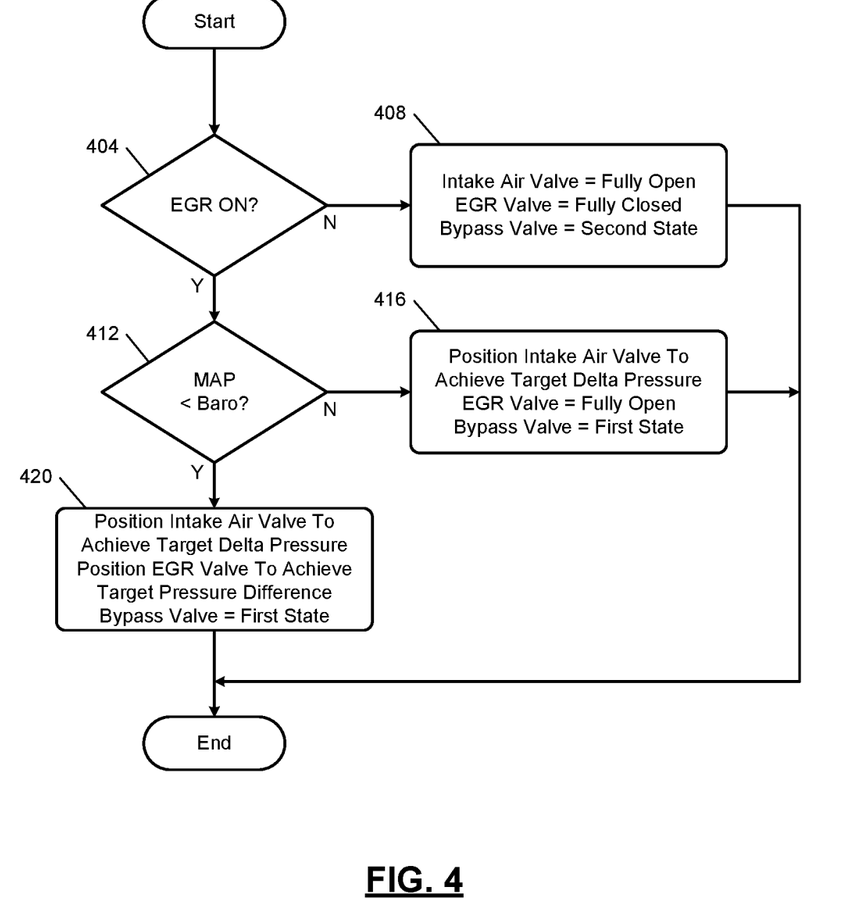
FIG. 4 is a flowchart depicting an example method of controlling an intake air valve, a bypass valve, and a EGR valve.

FIG. 4 is a flowchart depicting an example method of controlling the intake air valve 208, the bypass valve 224, and the EGR valve 170. Control begins with 404 where the ECM 114 determines whether EGR should be on and exhaust gas should be recirculated back to the intake manifold 110 from the dedicated EGR cylinder 220. If 404 is false, control transfers to 408.

At 408, the intake control module 360 sets the target intake opening 364 to a predetermined fully open opening (e.g., 100 percent open), the EGR control module 372 sets the target EGR opening 376 to a predetermined fully closed opening (e.g., 0 percent open), and the bypass control module 380 sets the target bypass opening 384 such that the bypass valve 224 will be in the second state. The intake actuator module 210 controls opening of the intake air valve 208 to achieve the target intake opening 364, the bypass actuator module 226 controls the bypass valve 224 to achieve the target bypass opening 384, and the EGR actuator module 172 controls the EGR valve 170 to achieve the target EGR opening 376. If 404 is true, control continues with 412.

At 412, the intake control module 360 and the EGR control module 372 determine whether the MAP 312 is less than (present) barometric pressure. A barometric pressure sensor may measure the barometric pressure. If 412 is true, control continues with 416. If 412 is false, control continues with 420.

At 416, the intake control module 360 sets the target intake opening 364 to adjust the intake pressure difference 368 toward or to the target delta pressure 332, the EGR control module 372 sets the target EGR opening 376 to the predetermined fully open opening (e.g., 100 percent open), and the bypass control module 380 sets the target bypass opening 384 such that the bypass valve 224 will be in the first state. The intake actuator module 210 controls opening of the intake air valve 208 to achieve the target intake opening 364, the bypass actuator module 226 controls the bypass valve 224 to achieve the target bypass opening 384, and the EGR actuator module 172 controls the EGR valve 170 to achieve the target EGR opening 376.

At 420, the intake control module 360 sets the target intake opening 364 to adjust the intake pressure difference 368 toward or to the target delta pressure 332, the EGR control module 372 sets the target EGR opening 376 to adjust the exhaust pressure difference 356 toward or to the target pressure difference 340, and the bypass control module 380 sets the target bypass opening 384 such that the bypass valve 224 will be in the first state. The intake actuator module 210 controls opening of the intake air valve 208 to achieve the target intake opening 364, the bypass actuator module 226 controls the bypass valve 224 to achieve the target bypass opening 384, and the EGR actuator module 172 controls the EGR valve 170 to achieve the target EGR opening 376.

For example, when the intake pressure difference 368 is less than the target delta pressure 332, the intake control module 360 may decrease the target intake opening to increase the intake pressure difference 368 toward or to the target delta pressure 332. When the intake pressure difference 368 is greater than the target delta pressure 332, the intake control module 360 may increase the target intake opening to decrease the intake pressure difference 368 toward or to the target delta pressure 332. When the exhaust pressure difference 356 is less than the target pressure difference 340, the EGR control module 372 may decrease the target EGR opening 376 to increase the exhaust pressure difference 356 toward or to the target pressure difference 340. When the exhaust pressure difference 356 is greater than the target pressure difference 340, the EGR control module 372 may increase the target EGR opening 376 to decrease the exhaust pressure difference 356 toward or to the target pressure difference 340.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An engine system comprising:
an internal combustion engine having a plurality of cylinders;
a bypass valve arranged to receive exhaust output from at least a dedicated one of the cylinders and to selectively one of:
direct the exhaust through an exhaust system to atmosphere; and
direct the exhaust to an exhaust gas recirculation (EGR) valve;
the EGR valve, wherein the EGR valve is configured to, when open, enable flow of the exhaust to an intake manifold of the internal combustion engine;
an intake air valve located between an air cleaner and a mass airflow (MAF) sensor and configured to, when open, enable flow of ambient air to the intake manifold;
an EGR pressure sensor configured to measure an EGR pressure at a location between the bypass valve and the EGR valve;
an exhaust pressure sensor configured to measure a pressure of the exhaust in the exhaust system downstream of the bypass valve;
an EGR control module configured to control opening of the EGR valve;
an intake control module configured to control opening of the intake air valve; and
a bypass control module configured to control actuation of the bypass valve,
wherein the bypass control module is configured to, in response to a determination to perform EGR, actuate the bypass valve to direct the exhaust to the EGR valve, and
wherein, in response to the determination to perform EGR, the intake control module is configured to, when a manifold absolute pressure within the intake manifold is greater than or equal to a barometric pressure, adjust the opening of the intake air valve based on a pressure delta across the intake air valve and a target delta pressure across the intake air valve.

2. The engine system of claim 1 further comprising an air/EGR mixer configured to mix:
the ambient air; and
exhaust received from the EGR valve.

3. The engine system of claim 2 further comprising an EGR conduit connected between the EGR valve and the air/EGR mixer, wherein the EGR conduit is less than a predetermined length.

4. The engine system of claim 3 wherein the predetermined length is 2 feet.

5. The engine system of claim 1 further comprising a turbine of a turbocharger located downstream of the bypass valve.

6. The engine system of claim 5 wherein a compressor of the turbocharger is located downstream of the MAF sensor.

7. The engine system of claim 1 further comprising an EGR cooler that is located between the bypass valve and the EGR valve and that is configured to cool the exhaust flowing from the bypass valve to the EGR valve.

8. The engine system of claim 1 further comprising a delta pressure sensor configured to measure a pressure delta across the intake air valve.

9. The engine system of claim 1 wherein the intake control module is configured to adjust the opening of the intake air valve based on adjusting the pressure delta across the intake air valve toward the target delta pressure across the intake air valve.

10. The engine system of claim 1 wherein, in response to the determination to perform EGR, the EGR control module is configured to, when the manifold absolute pressure within the intake manifold is greater than the barometric pressure, open the EGR valve to a predetermined fully open position.

11. The engine system of claim 1 wherein, in response to the determination to perform EGR, the intake control module is configured to, when the manifold absolute pressure within the intake manifold is less than the barometric pressure, adjust the opening of the intake air valve based on the pressure delta across the intake air valve and the target delta pressure across the intake air valve.

12. The engine system of claim 11 wherein, in response to the determination to perform EGR, the EGR control module is configured to, when the manifold absolute pressure within the intake manifold is less than the barometric pressure, adjust the opening of the EGR valve based on (1) a pressure difference between the EGR pressure and the pressure in the exhaust system downstream of the bypass valve and (2) a target value of the pressure difference between the EGR pressure and the pressure in the exhaust system downstream of the bypass valve.

13. The engine system of claim 12 wherein the EGR control module is configured to adjust the opening of the EGR valve based on adjusting the pressure difference toward the target value of the pressure difference.

14. The engine system of claim 1 wherein the bypass control module is configured to, in response to a determination to not perform EGR, actuate the bypass valve to direct the exhaust through the exhaust system to atmosphere.

15. The engine system of claim 14 wherein:
the intake control module is configured to, in response to the determination to not perform EGR, open the intake air valve to a predetermined fully open position; and
the EGR control module is configured to, in response to the determination to not perform EGR, close the EGR valve to a predetermined fully closed position.

* * * * *